United States Patent Office 3,057,895
Patented Oct. 9, 1962

3,057,895
NITROGENOUS ORGANOMETALLIC
COMPOUNDS
Iral B. Johns, Marblehead, and Harry R. Di Pietro, Watertown, Mass., assignors to Monsanto Research Corporation, St. Louis, Mo., a corporation of Delaware
No Drawing. Filed July 13, 1961, Ser. No. 123,662
6 Claims. (Cl. 260—429.9)

This invention relates to nitrogenous organometallic compounds and more particularly to nitrile-substituted aryloxy compounds of certain bivalent, tetracoordinating metal ions and to the method of preparing the same.

According to the invention there are provided compounds containing one atom of metal and two oxybenzonitrile moieties by the reaction of a 2-hydroxyarylnitrile with a dialkyl metal, substantially according to the scheme:

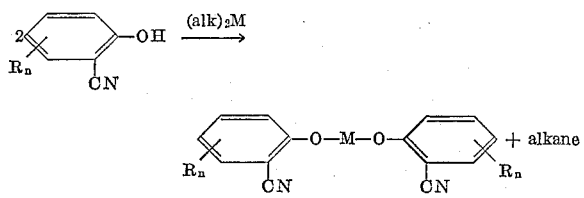

wherein R is selected from the class consisting of alkyl and alkoxy radicals of from 1 to 5 carbon atoms, $n$ is a number of 0 to 2, M is selected from the class consisting of beryllium, zinc and cadmium, alk denotes an alkyl radical of from 1 to 5 carbon atoms, and the alkane has the number of carbon radicals which are present in the alkyl radical.

The presently useful 2-hydroxyarylnitriles include salicylonitrile and nuclearly substituted salicylonitriles having from 1 to 2 alkyl and/or alkoxy substituents of from 1 to 5 carbon atoms, e.g., o-cresotonitrile, 3,4-dimethylsalicyclonitrile, 4 - methoxysalicylonitrile, 3 - butoxysalicylonitrile, 3,5 - diethylsalicylonitrile, 4,6 - dimethoxysalicylonitrile, 3 - pentylsalicylonitrile, 3 - methyl - 2 - propoxysalicylonitrile, etc.

Particularly valuable for the present purpose owing to their easy availability and the utility of the bis(2-cyanoaryloxy)metal compounds prepared therefrom, are the dialkyl compounds of beryllium, zinc and cadmium. Examples of presently useful dialkyl compounds are dipropylberyllium(II), dimethylberyllium(II), dibutylzinc(II), dipentylzinc(II), diisopropylberyllium(II), ethylmethylzinc(II), dibutylcadmium(II), diethylcadmium(II), etc.

According to the invention, reaction of salicylonitrile with dibutylzinc(II) gives bis(2-cyanophenoxy)zinc(II); reaction of 2,3-cresotonitrile with diethylcadmium(II) gives bis(2-cyano-6-methylphenoxy)cadmium(II); reaction of 4-pentylsalicylonitrile with dimethylzinc(II) gives bis(2-cyano-5-pentylphenoxy)zinc(II); reaction of 3-methoxysalicylonitrile with diethylberyllium gives bis(2-cyano-6-methoxyphenoxy)beryllium(II); reaction of 6-pentyloxysalicylonitrile with dipropylcadmium(II) gives bis(2-cyano-3-pentylphenoxy)cadmium(II); reaction of 4-ethoxysalicylonitrile with diethylberyllium(II) gives bis(2-cyano-5-ethoxyphenoxy)beryllium(II); reaction of 3-ethylsalicylonitrile with dibutylzinc(II) gives bis(2-cyano-6-ethylphenoxy)zinc(II); reaction of 5-isopropylsalicylonitrile with dimethylberyllium(II) gives bis(2-cyano - 4 - isopropylphenoxy)beryllium(II); reaction of 4,5-diethylsalicylonitrile with dipropylcadmium(II) gives bis(2-cyano-4,5-diethylphenoxy)cadmium(II); reaction of 3-ethyl-4-methoxysalicylonitrile with dipentylzinc(II) gives bis(2 - cyano - 6 - ethyl - 5 - methoxyphenoxy)zinc(II), etc.

Reaction of the dialkyl metal(II) compound with the salicylonitrile or with the nuclearly alkylated or alkoxylated salicylonitriles takes place readily by mixing the two reactants at ordinary or moderately increased temperature and preferably in the presence of an inert diluent or solvent. Advantageously, the dialkyl metal compound is added gradually to a solution of the hydroxy nitrile in a substantially oxygen free atmosphere. The desired bis(2-cyanoaryloxy)metal(II) is formed almost immediately. When the diluent is a material which is a solvent for the hydroxy nitrile but is a non-solvent for the bis(2-cyanoaryloxy)metal(II), the latter precipitates from the reaction mixture as the dialkyl metal compound is added. Filtration and drying gives the substantially pure bis(2-cyanoaryloxy)metal(II). When the diluent dissolves both the starting hydroxynitrile and the product, the latter can be separated from the reaction mixture by fractional distillation, solvent extraction, etc. Useful solvents are the aliphatic and aromatic hydrocarbons liquids generally, e.g., hexane, octane, benzene, toluene or xylene, the chlorinated hydrocarbons such as carbon tetrachloride, hexachloroethane or dichlorobenzene; oxygen-containing compounds such as acetone, ethyl ether or dioxane are especially useful.

The reaction takes place with the formation, as by-product, of an alkane corresponding in carbon content to that of the alkyl radical of the dialkyl metal compound used as reactant. For example, when dipropylzinc is employed as the dialkyl metal, the by-product is propane. It is evolved at a rate which is proportionate to that at which the dialkyl metal compound is added.

The presently provided bis(2-cyanoaryloxy)metal(II) compounds are stable, well-defined compounds which are generally crystalline solids. They are advantageously employed for a variety of commercial and agricultural purposes, e.g., as extreme pressure resisting additives for lubricants; as heat and light stabilizers in the manufacture of molded or cast plastic products, e.g., from polyvinyl chloride; and as bactericides and fungicides. As disclosed in our copending application Serial No. 123,637 filed of even date, they are very advantageously employed in the preparation of polymeric, cyclic chelates by reaction with 2-hydroxyarylnitriles or ethers of the same at temperatures of, say, from 150°–300° C. and at pressures of from 5,000 to 14,000 atmospheres. Formed, polymeric solids are obtained by preparing the polymeric chelates in the high pressure mold. The well-dimensioned solids thus obtained are very heat-resistant, i.e., they are generally unaffected by heat at temperatures below about 500° C.; they have high breaking strengths, and very good values are obtained in tests for deflection before rupture.

Polymeric, cyclic chelates which are obtained by the high temperature, high pressure reaction of the presently provided bis(2-cyanoaryloxy)metal(II) compounds and the free 2-hydroxyarylnitrile consist essentially of the repeating unit:

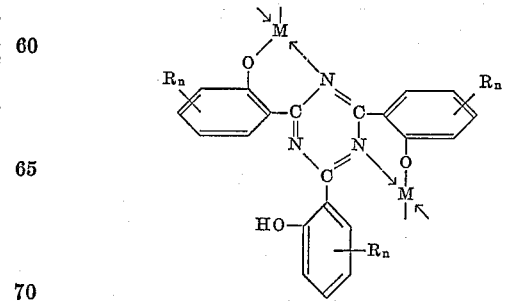

wherein R is selected from the class consisting of alkyl and alkoxy radicals of from 1 to 5 carbon atoms, $n$ is a number of 0 to 2, M is cadmium, zinc or beryllium, and each depicted dangling valence is satisfied by linkage to an oxygen atom of the repeating unit and each depicted dangling coordinate bond is satisfied by linkage to a nitrogen atom of the repeating unit.

When the presently provided bis(2-cyanoaryloxy)-metal(II) compound is condensed under heat and pressure with an ether of a 2-hydroxyarylnitrile, the HO— radical in the above formula is an ether radical. The polymeric chelates generally resemble those obtained by the reaction of a bivalent transition metal salt or oxide with trimeric 2-hydroxyarylnitriles, e.g., the 2,4,6-tris(2-hydroxyphenyl)-s-triazine which is the trimer of salicylonitrile. They are characterized by a high degree of stability to heat and solvents, which stability may be ascribed not only to the presence of the metal but also to the triazine structure and the coordinate bonding. They are, therefore, of particular utility in the fabrication of hard, molded pieces destined to be used under conditions involving exposure to extreme heat and/or attack by solvents.

The invention is further illustrated by, but not limited to, the following examples.

*Example 1*

Bis(2-cyanophenoxy)zinc(II) was prepared as follows: A mixture consisting of 4.8 g. of salicylonitrile and 60 ml. of benzene was warmed to solution under nitrogen, and there was added thereto, dropwise, 12 ml. of a 25% solution of diethyl zinc in benzene, while maintaining the reaction mixture in a nitrogen atmosphere. Ethane was evolved at a rapid rate as the diethyl zinc was added. The white solid which was immediately precipitated in the reaction mixture was rapidly filtered, with exclusion of moisture, washed with benzene and dried to give the substantially pure bis(2-cyanophenoxy)-zinc(II), and analyzing 19.93% Zn as against 21.68%, the calculated value for $C_{14}H_8N_2O_2Zn$.

The above prepared compound was converted to a molded polymeric chelate in a Bridgman apparatus built for use at high temperature. The anvils of the apparatus were made of high speed steel, 3″ in diameter and 3″ long, tapered at one end at an angle of 65° to the central axis. The cones were truncated to give flat surfaces ⅜″ in diameter. The anvils were equipped with heaters capable of raising the temperature to 450° C., and they were supported in a hydraulic press on water-cooled bases and were insulated from the bases by thick mica sheets. The maximum pressure attainable between the anvil faces was 37,500 kg./cm.²

An iron or brass ring having an internal diameter of ⅜″ was placed on lower anvil to serve as a mold. A mixture consisting of 0.3 g. of the bis(2-cyanophenoxy)-zinc(II) and 0.12 g. of salicylonitrile was placed in the ring and compression molded at 250° C. and 8670 kg./cm.² for 25 minutes to give a very hard, coherent disc having a uniform thickness of 0.84 mm.

*Example 2*

A mixture consisting of 0.3 g. of bis(2-cyanophenoxy)-zinc(II) of Example 1 and 2 g. of 2-phenoxybenzonitrile was intimately ground together in a mortar and compression molded in the high pressure apparatus described in Example 1 at a pressure of 7650 kg./cm.² and a maximum temperature of 265°–270° C. for 40 minutes. The molded, polymeric zinc chelate thus obtained was a smooth, yellow disc, 0.77 mm. thick and 9.55 mm. in diameter. Testing in the Instron tensile tester, employing a round-end indenter (1/16″ radius) on the center gave a break force of 72 g. and a deflection of 0.2 mm. before rupture.

What we claim is:

1. A compound of the formula

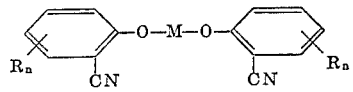

wherein R is selected from the class consisting of alkyl and alkoxy radicals of from 1 to 5 carbon atoms, $n$ is a number of 0 to 2, and M is selected from the class consisting of beryllium, zinc and cadmium.

2. A compound of the formula

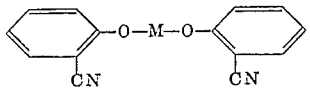

in which M is selected from the class consisting of beryllium, zinc and cadmium.

3. Bis(2-cyanophenoxy)zinc(II).

4. The method which comprises contacting a hydroxy nitrile of the formula

in which R is selected from the class consisting of alkyl and alkoxy radicals of from 1 to 5 carbon atoms and $n$ is a number of 0 to 2, with a dialkyl metal of the formula $(alk)_2M$ in which alk denotes an alkyl radical of from 1 to 5 carbon atoms and M is selected from the class consisting of beryllium, zinc and cadmium, and recovering from the resulting reaction product a compound of the formula

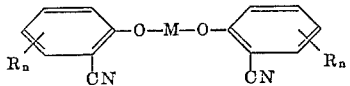

in which R, $n$ and M are as above defined.

5. The method which comprises contacting salicylonitrile with a dialkyl metal of the formula $(alk)_2M$ in which alk denotes an alkyl radical of from 1 to 5 carbon atoms and M is selected from the class consisting of beryllium, zinc and cadmium, and recovering from the resulting reaction product a compound of the formula

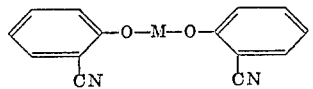

in which M is as above defined.

6. The method which comprises contacting salicylonitrile with diethylzinc and recovering bis(2-cyanophenoxy) zinc (II) from the resulting reaction product.

No references cited.